(12) United States Patent
Deshpande et al.

(10) Patent No.: US 8,266,681 B2
(45) Date of Patent: Sep. 11, 2012

(54) SYSTEM AND METHOD FOR AUTOMATIC NETWORK LOGON OVER A WIRELESS NETWORK

(75) Inventors: Sumit B. Deshpande, Central Islip, NY (US); Srinivas Gudipudi, Hyderabad (IN); Muralidhar S. Swarangi, Visakhapatnam (IN); Ravi R. Pore, Maharashtra (IN); Rohit Shankar, Hyderabad (IN); Theodore R. Short, Jacksonville, FL (US); Yidong Zhu, Lincolnshire, IL (US)

(73) Assignee: CA, Inc., Islandia, NY (US)

( * ) Notice: Subject to any disclaimer, the term of this patent is extended or adjusted under 35 U.S.C. 154(b) by 834 days.

(21) Appl. No.: 11/468,209

(22) Filed: Aug. 29, 2006

(65) Prior Publication Data

US 2008/0060061 A1  Mar. 6, 2008

(51) Int. Cl.
*H04L 29/06* (2006.01)
(52) U.S. Cl. ............ 726/5; 726/3; 726/4; 726/7; 726/8; 380/270
(58) Field of Classification Search ............ 726/3, 4, 726/5, 6, 7, 8, 9, 10; 380/255, 270, 272, 380/273; 713/150, 153, 155, 168, 170, 182, 713/185, 186
See application file for complete search history.

(56) References Cited

U.S. PATENT DOCUMENTS

| | | | |
|---|---|---|---|
| 6,259,405 B1* | 7/2001 | Stewart et al. | 342/457 |
| 6,401,211 B1* | 6/2002 | Brezak et al. | 726/5 |
| 6,516,416 B2* | 2/2003 | Gregg et al. | 726/8 |
| 6,912,567 B1* | 6/2005 | Allard et al. | 709/223 |
| 7,483,984 B1* | 1/2009 | Jonker et al. | 709/226 |
| 7,490,348 B1* | 2/2009 | Harris | 726/4 |
| 2002/0083114 A1* | 6/2002 | Mazzagatte et al. | 709/100 |
| 2002/0161886 A1* | 10/2002 | Wang et al. | 709/225 |
| 2003/0087629 A1* | 5/2003 | Juitt et al. | 455/411 |
| 2003/0093539 A1* | 5/2003 | Simeloff et al. | 709/229 |
| 2003/0152035 A1* | 8/2003 | Pettit et al. | 370/252 |
| 2003/0212800 A1* | 11/2003 | Jones et al. | 709/228 |
| 2003/0233332 A1* | 12/2003 | Keeler et al. | 705/64 |
| 2004/0073672 A1* | 4/2004 | Fascenda | 709/225 |
| 2004/0102182 A1* | 5/2004 | Reith et al. | 455/410 |
| 2004/0111520 A1* | 6/2004 | Krantz et al. | 709/229 |
| 2005/0037733 A1* | 2/2005 | Coleman et al. | 455/411 |
| 2005/0172117 A1* | 8/2005 | Aura | 713/155 |
| 2005/0275866 A1* | 12/2005 | Corlett | 358/1.14 |
| 2006/0047829 A1* | 3/2006 | Acharya et al. | 709/229 |
| 2006/0224518 A1* | 10/2006 | Khusial et al. | 705/52 |

OTHER PUBLICATIONS

Matsunaga et al., "Secure Authentication System for Public WLAN Roaming", Sep. 19, 2003, ACM, pp. 113-121.*

Miu, A. and Bahl, P. 2001. Dynamic host configuration for managing mobility between public and private networks. In Proceedings of the 3rd Conference on USENIX Symposium on internet Technologies and Systems—vol. 3 (San Francisco, California, Mar. 26-28, 2001). USENIX Association, Berkeley, CA, 13-13.*

* cited by examiner

*Primary Examiner* — Eleni Shiferaw
*Assistant Examiner* — Hilary Branske
(74) *Attorney, Agent, or Firm* — Baker Botts L.L.P.

(57) ABSTRACT

A method for providing access to one or more resources in a computer network, establishing a connection between a user and the computer network via at least one wireless access point, generating an authentication level for the user associated with accessing the one or more resources, sending a program to the client device, receiving authentication data from the user, and changing the authorization level of the user based upon the authentication data received from the user.

25 Claims, 3 Drawing Sheets

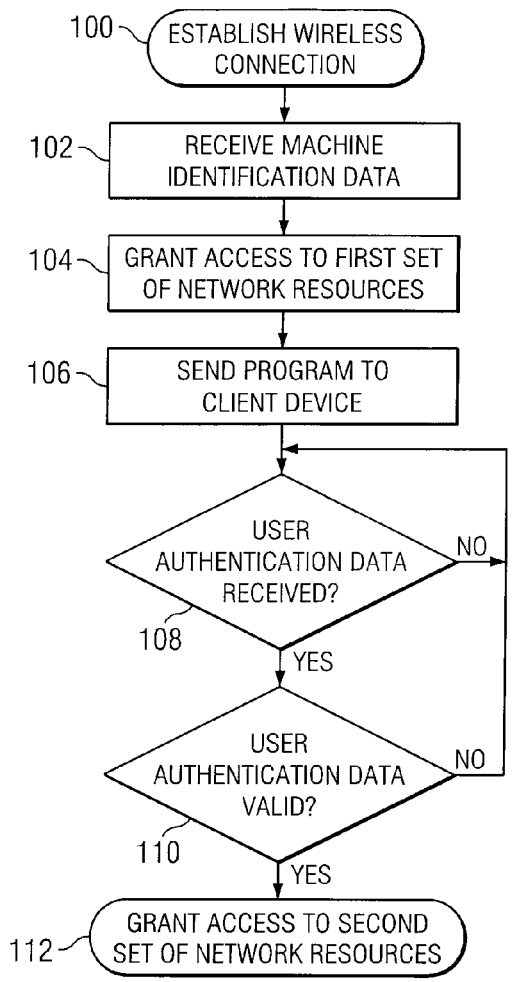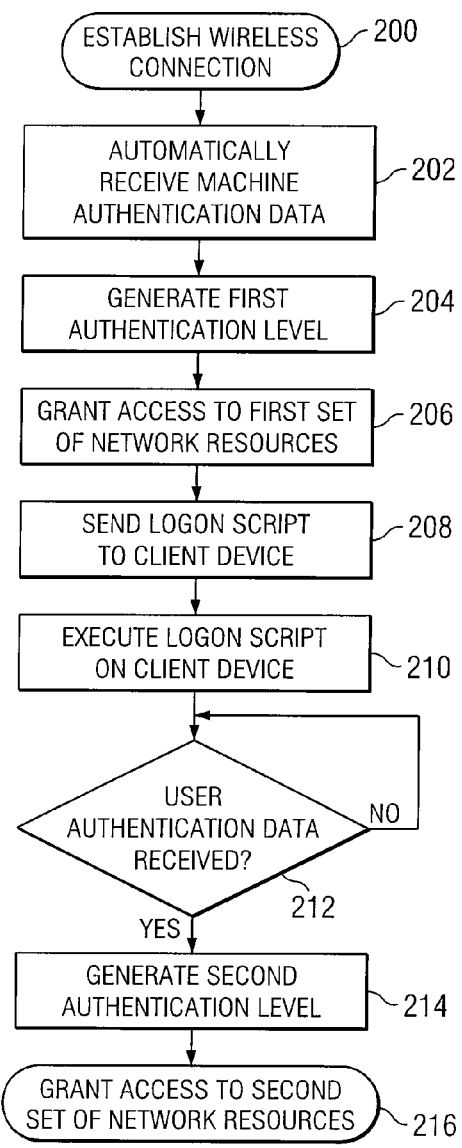

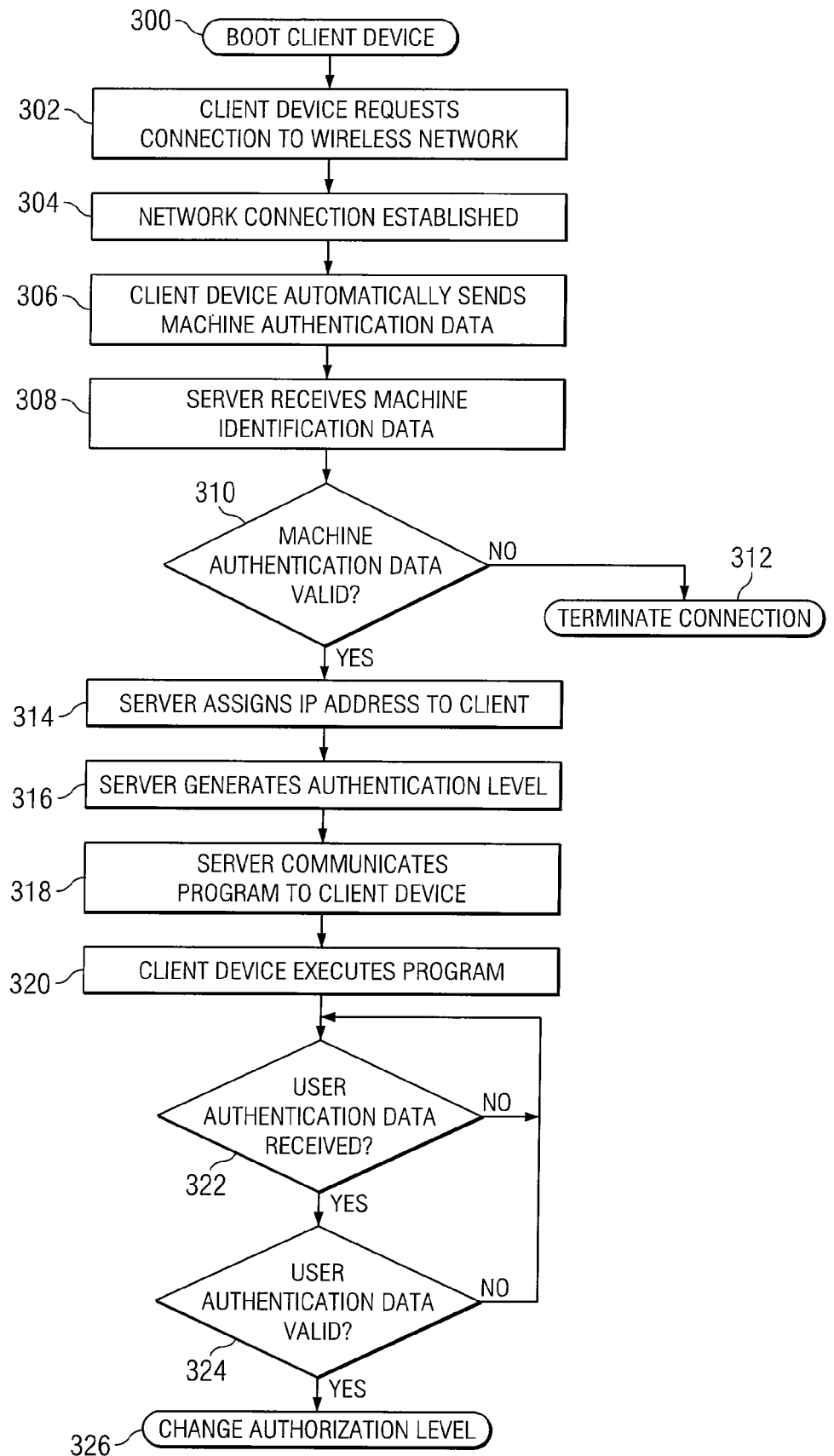

SYSTEM AND METHOD FOR AUTOMATIC NETWORK LOGON OVER A WIRELESS NETWORK

TECHNICAL FIELD OF THE INVENTION

The present invention relates generally to wireless computer networks and more particularly to a system and method for automatic network logon over a wireless network.

BACKGROUND OF THE INVENTION

Computer networks allow their users to access file servers, printers, communication hardware, and various other peripheral devices. In order to restrict access to such shared resources, a network administrator may configure the network to require that authentication data be received from the computer attempting to connect before granting access to the network or to certain portions of the network. Once the connecting computer has been authenticated, it may be desired to run certain programs, e.g., logon scripts, that may modify the configuration of that computer in certain ways.

It is common for a network to include a series of computers that are interconnected using various cables, e.g., Ethernet cables. Nevertheless, a computer network may be configured to allow access over a wireless communication link, e.g., via a wireless access point. Such networks also may require authentication before granting access to shared network resources. Connecting to a network via a wireless connection may cause certain obstacles that are more problematic than in a wired network. For example, a computer may establish a wireless connection to a network while being restricted from accessing certain shared resources on the network. In such a situation, it is possible that programs that would typically execute upon authentication, e.g., logon scripts, may not be accessible to the computer.

OVERVIEW OF EXAMPLE EMBODIMENTS

According to an embodiment of the present invention, a method for accessing one or more resources in a computer network includes establishing a connection between a client computer and the network via one or more wireless access points, automatically receiving the first set of authentication data from the client, providing access to a first set of network resources corresponding to the first set of authentication data, executing one or more programs, receiving a second set of authentication data from the client computer, and providing access to a second set of network resources corresponding to the second set of authentication data.

According to another embodiment of the present invention, a method for accessing one or more resources in a computer network includes establishing a connection between a user and the computer network via at least one wireless access point, generating an authentication level for the user associated with accessing the one or more resources, receiving authentication data from the user during the connection, and changing the authorization level of the user based upon the authentication data received during the connection.

According to still another embodiment of the present invention, a computer system includes a processor and a storage device readable by the computer system. The system uses a program of instructions executable by the processor to perform acts for accessing one or more resources in a computer network. The computer is operable to establish a connection between a user and the computer network via at least one wireless access point, generate an authentication level for the user associated with accessing the one or more resources, receive authentication data from the user during the connection, and change the authorization level of the user based upon the authentication data received during the connection.

According to yet another embodiment of the present invention, a computer system includes a processor and a storage device readable by the computer system. The system uses a program of instructions executable by the processor to perform acts for accessing one or more resources in a computer network. The computer is operable to establish a connection between a client computer and the network via one or more wireless access points, automatically receive the first set of authentication data from the client, provide access to a first set of network resources corresponding to the first set of authentication data, execute one or more logon scripts, receive a second set of authentication data from the client computer, and provide access to a second set of network resources corresponding to the second set of authentication data.

A technical advantage of one embodiment of the present invention is that a computer may connect to a network via a wireless connection and be granted sufficient access to network resources to allow certain programs to be executed, e.g., logon scripts, while still allowing a subsequent user authentication to permit access to other shared network resources. While specific advantages have been enumerated above, various embodiments may include all, some, or none of the enumerated advantages. Other technical advantages of the present invention will be readily apparent to one skilled in the art from the following figures, descriptions, and claims.

BRIEF DESCRIPTION OF THE DRAWINGS

For a more complete understanding of the present invention and its features and advantages, reference is now made to the following description, taken in connection with the accompanying drawings, in which:

FIG. 2 is a flow diagram depicting one embodiment of a method for automatic network logon over a wireless network;

FIG. 3 is a flow diagram depicting another embodiment of a method for automatic network logon over a wireless network; and FIG. 4 is a flow diagram depicting yet another embodiment of a method for automatic network logon over a wireless network.

DESCRIPTION OF EXAMPLE EMBODIMENTS

Figure 1:
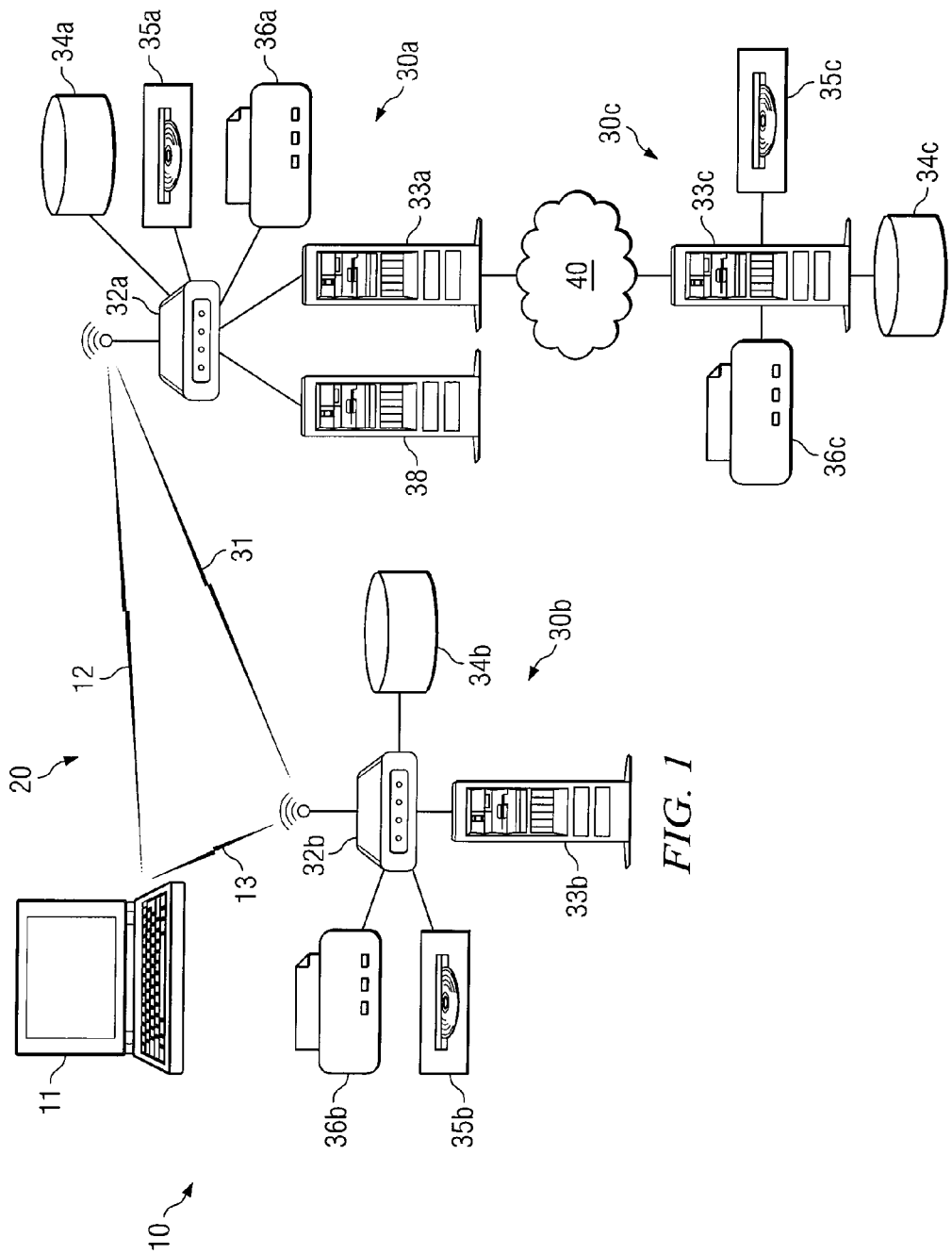
FIG. 1 illustrates a system that incorporates aspects of the present invention.

Embodiments of the present invention and its advantages are best understood by referring to FIGS. 1 through 4 of the drawings, like numerals being used for like and corresponding parts of the various drawings.

FIG. 1 illustrates one embodiment of a system 10 for allowing automatic network logon over a wireless network. As shown in FIG. 1, system 10 generally includes a network 20 and one or more wireless access points 32.

Network 20 may refer to any interconnecting system capable of transmitting audio, video, signals, data, messages, or any combination of the preceding. Network 20 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Network 20 may transmit information in packet flows in one embodiment. A packet flow includes one or more packets sent from a source to a destination. A packet may comprise a bundle of data organized in a specific way for transmission, and a frame may comprise the payload of one or more packets organized in a specific way for transmission. A packet-based communication protocol, such as Internet Protocol (IP), may be used to communicate the packet flows.

A packet flow may be identified in any suitable manner. As an example, a packet flow may be identified by a packet identifier giving the source and destination of the packet flow. A source may be given by an address, such as the IP address, port, or both. Similarly, a destination may be given by an address, such as the IP address, port, or both.

Network 20 may utilize protocols and technologies to transmit information. Example protocols and technologies include those described by the Institute of Electrical and Electronics Engineers, Inc. (IEEE) 802.xx standards, such as 802.11, 802.16, or WiMAX standards, the International Telecommunications Union (ITU-T) standards, the European Telecommunications Institute (ETSI) standards, Internet Engineering Task Force (IETF) standards, the third generation partnership project (3GPP) standards, or other standards.

Network 20 may comprise one or more subnetworks, such as subnetworks 30a, 30b, and 30c. The subnetworks 30 of network 20 may utilize any suitable means of connection and any suitable communication protocols or technologies. Each subnetwork 30 may also have a variety of network resources. For example, subnetwork 30a may be connected via access point 32a and include one or more servers 33a. Subnetwork 30a may also include one or more storage media 34a, such as hard disk drives, volatile or non-volatile memory, optical disk storage devices, or any other storage devices, including removable storage devices 35a. Subnetwork 30a may further include one or more peripheral devices 36a. Peripheral device 36a may be any type of peripheral device for use in a network, including a printer, scanner, communication device, etc.

Similarly, subnetwork 30b may include one or more servers 33b. Subnetwork 30b may also include one or more storage devices 34b, such as hard disk drives, volatile or non-volatile memory, optical disk storage devices, or any other storage devices, including removable storage devices 35b. Subnetwork 30b may further include one or more peripheral devices 36b. Peripheral device 36b may be any type of peripheral device for use in a network, including a printer, scanner, communication device, etc.

Similarly, subnetwork 30c may include one or more servers 33c. Subnetwork 30c may also include one or more storage devices 34c, such as hard disk drives, volatile or non-volatile memory, optical disk storage devices, or any other storage devices, including removable storage devices 35c. Subnetwork 30c may further include one or more peripheral devices 36c. Peripheral device 36c may be any type of peripheral device for use in a network, including a printer, scanner, communication device, etc. Subnetwork 30c is shown in one example embodiment utilizing a connection to network 20 via the interne, where the connection is depicted as cloud 40.

Access point 32 may be any network point suitable to couple a wireless device, such as client device 11, to network 20. Although FIG. 1 depicts client device 11 as a laptop computer, client device 11 may be any device capable of accessing a wireless network. For example, client device 11 may be a desktop computer, a palmtop computer or personal digital assistant (PDA), a cellular telephone, a mobile handset, or any type of electronic device operable to communicate with access point 32.

In one embodiment, client device 11 may connect to network 20 via a first wireless link 12. In another alternative embodiment, client device 11 may connect to network 20 over a second wireless link 13 via access point 32b, shown in FIG. 1 in one example embodiment acting as a wireless bridge to subnetwork 30a. As another alternative, client device 11 may connect using more than one wireless access point. For example, wireless traffic from client device 11 may be distributed over first wireless link 12 and a second wireless link 13.

In particular embodiments of the invention, communications between client device 11 and access point 32 are effected according to one or more secure wireless communication protocols or WLAN protocols, such as protions or all of the Wired Equivalent Privacy (WEP) protocol, the Robust Security Network (RSN) associated with the IEEE 802.11i protocol, the IEEE 802.1x protocol, the Advanced Encryption Standard (AED), the Temporal Key Integrity Protocol (TKIP), Extensible Authentication Protocol over LAN (EAPOL) algorithms or protocols (such as EAP-TTLS, PEAP, or CISCO's LEAP or EAP-FAST protocols, for example), WiFi Protected Access (WPA) protocol, WiFi Protected Access Pre-shared key (WPA-PSK) protocol, WiFi Protected Access Version 2 (WPA2) protocol, or WiFi Protected Access Version 2 Pre-shared key (WPA2-PSK) protocol, for example.

In various embodiments of the invention, a client device 11 may access network 20. If the client device 11 is not granted any access to resources of network 20, client device 11 may not be unable to access programs stored on a server, such as server 33a, that are intended to be communicated to the client device 11 for execution thereon, e.g., logon scripts. When a user of client device 11 provides authentication data to an authentication device 38, it is possible that a program on a server, such as server 33a, may have timed out before access was granted to the required resources of network 20.

According to one embodiment of the invention, client device 11 initially secures basic rights to certain resources of network 20. Such rights may allow client device 11 to access one or more resources of network 20, receive one or more programs from a server, such as server 33a, and execute the one or more programs on client device 11 before a user of client device 11 has provided authentication data to authentication device 38. The user of client device 11 is free to provide authentication data at a later time without a timeout occurring that might preclude the one or more programs from executing on client device 11.

FIG. 2 is a flow diagram illustrating example acts associated with automatic network logon over a wireless network. Reference is made to the network 20 of FIG. 1 for simplicity of description, but these example acts may be performed in the context of networks other than that shown in FIG. 1. At step 100, a wireless connection may be established between client device 11 and network 20.

At step 102, an authentication device 38 within network 20 may receive machine identification data from the client device 11. Although reference is made to authentication device 38 for simplicity, any suitable device configured to authenticate a user of client device 11 on network 20 may be utilized. For example, such a device may be one or more servers 33a, 33b, or 33c, or another component of the network. The machine identification data may uniquely identify the client device 11 that is connecting to the network.

At step 104, based upon the received machine identification data, authentication device 38 may allow the client device 11 to access certain network resources. For example, access could be granted to one or more servers, such as servers 33*a*, 33*b*, and 33*c* depicted in FIG. 1. In addition, access may be granted to one or more storage devices, such as storage devices 34*a*, 34*b*, and 34*c*. Further, access may be granted to one or more peripheral devices, such as peripheral devices 36*a*, 36*b*, and 36*c*. Based upon an authentication database maintained on the network 20 and accessible to authentication device 38, the client device 11 may be granted access to one or more of the above mentioned resources, or any combination thereof.

At step 106, one or more programs may be communicated to client device 11 based upon the machine identification data. In this example embodiment, client device 11 executes the program. For example, one or more logon scripts may be executed. However, the executed programs are not limited to logon scripts, and the device that executes the program instructions is not limited to client device 11. For example, the program could be executed on another device in network 20, and results of such execution may be communicated to client device 11. In another example embodiment, the program could be executed on one or more servers, such as servers 33*a*, 33*b*, or 33*c*, or on authentication device 38. The one or more programs may cause the client device 11 to become configured in a certain manner.

A user of the client device 11 may choose to provide one or more pieces of user identification data. For example, in one example embodiment a user identification and password pair may be manually entered into the client device 11. However, any suitable data and method of providing user identification data may be used. For example, user identification data may be stored in a removable media device, such as a smart card, a non-volatile memory chip, or some other storage device. As an alternative, user identification data may include a code stored in a radio frequency identification tag. As yet another alternative, the user identification data may be biometric in nature. Examples of such data may include a fingerprint, a pattern of a user's retina, or a pattern of a user's speech. Any suitable data may be used to identify the user of client device 11, including one or more of those mentioned above, or a combination thereof.

At step 108, authentication device 38 may determine whether user identification data has been received from the client device. If user identification data is not received in step 108, authentication device 38 may continue to poll the wireless connection to the client device 11 to listen for user identification data. As an alternative, authentication device 38 may stop polling the wireless connection. For example, a timeout period may elapse after which authentication device 38 may not provide access to the resources or may not accept user identification data.

If user identification data is received in step 108, authentication device 38 may determine whether authentication data of the user of client device 11 is valid in step 110. If the user authentication data is valid, in step 112 authentication device 38 may grant access to a second set of network resources. This second set of network resources may or may not include the first set of network resources. If the user identification data is not valid, authentication device 38 may return to step 108 and wait for user authentication data to be received. As an alternative, authentication device 38 may terminate the connection to the client device. This may be done, for example, in a network where unauthorized intrusion carries a high risk of loss or theft of data.

Thus, according to the above-described embodiment, a method is provided for providing access to one or more network resources before a user has completed a logon procedure. This allows the user's client device to run a program using data from the network that is tailored to that client device, while still allowing that user to gain access to other additional or different network resources based upon authentication data provided during a subsequent logon process.

FIG. 3 is a flow diagram illustrating another embodiment of example acts associated with automatic network logon over a wireless network. Reference is made to the network 20 of FIG. 1 for simplicity of description, but these example acts may be performed in the context of networks other than that shown in FIG. 1. At step 200, a wireless connection may be established between the client device 11 and the network 20.

At step 202, an authentication device 38 within the network 20 may automatically receive machine identification data from client device 11. For example, such a device may be an authentication server or other component of the network. The machine identification data may uniquely identify the client device 11 that is connecting to network 20.

At step 204, based upon the received machine identification data, authentication device 38 may generate a first authentication level. At step 206, authentication device 38 may grant access to a first set of network resources based upon the first authentication level. In one example, the first authentication level permits access only to a one server, such as one of servers 33*a*, 33*b*, and 33*c* depicted in FIG. 1. In another example, the first authentication level may permit access to one or more servers, such as servers 33*a*, 33*b*, and 33*c*; one or more of peripherals 36*a*, 36*b*, and 36*c*; and one or more media storage devices, such as servers 34*a*, 34*b*, and 34*c*. In one example embodiment, the one or more of peripherals 36*a*, 36*b*, and 36*c* may be one or more printers.

At step 208, one or more devices on network 20 may communicate a logon script to client device 11. For example, authentication device 38 may send a logon script to client device 11. In other embodiments, one or more servers, such as 33*a*, 33*b*, or 33*c* depicted in FIG. 1, may send one or more logon scripts to client device 11 based upon the machine identification data received in step 202.

At step 210, the one or more logon scripts communicated to client device 11 in step 208 may be executed on client device 11. While the example embodiment depicted in FIG. 3 indicates that a logon script is executed on client device 11, other programs may be executed on other devices in network 20 and still be within the spirit and scope of the present invention. For example, the one or more programs may be executed on any suitable device in network 20, such as one or more of servers 33*a*, 33*b*, and 33*c*, authentication device 38, or some other suitable component configured to interact in network 20.

In addition, the type of program executed is not limited to only logon scripts. For example, one or more programs may be executed, or one or more services may interact with a server, such as server 33*a*, and client device 11. In another example, an executable program may run on one of the components of network 20, such as authentication device 38. The one or more programs may cause the client device to become configured in a certain manner.

At step 212, authentication device 38 determines whether user identification data has been received from the client device. If user identification data is not received in step 212, authentication device 38 may continue to poll the wireless connection to the client device to listen for user identification data. As an alternative, authentication device 38 may choose to stop polling the wireless connection. For example, a timeout period may elapse after which authentication device 38 does not provide access to the resources or ceases to accept user identification data.

If authentication data for a user of client device 11 is received in step 212, authentication device 38 may generate a second authentication level in step 214. The second authentication level may be higher or lower than the first authentication level. For example, in response to receipt of valid user authentication data, client device 11 may be allowed access to another set of system resources in step 216. In another example, in response to receipt of invalid user authentication data, authentication device 38 may lower the authentication level in step 216. By lowering the authentication level, client device 11 may be further limited in which network resources it may access. In another example, lowering the authentication level in response to invalid user identification data may result in denying access to any resources of network 20. In yet another example, lowering the authentication level may result in termination of the connection between client device 11 and network 20.

Thus, according to the above-described embodiment, a method is provided for providing limited access to one or more network resources before a user has completed a logon procedure. A device within the network may be configured to send a program, e.g., a logon script, to the client device for processing before the user of client device 11 has completed a logon procedure. The user may still be allowed to complete a logon procedure after that time and gain access to other additional or different network resources based upon authentication data provided.

FIG. 4 is a flow diagram illustrating another embodiment of example acts associated with automatic network logon over a wireless network. Reference is made to the network 20 of FIG. 1 for simplicity of description, but these example acts may be performed in the context of networks other than that shown in FIG. 1. At step 300, a client device 11 may be initialized or "booted up." In one example, step 300 may be initiated by cycling power to client device 11 (e.g., a "cold boot"). In another example, step 300 may be initiated by restarting client device 11 without interrupting power (e.g., a "warm boot").

At step 302, client device 11 may request connection to network 20, and such request may be accepted by authentication device 38. If the request is accepted, a network connection is established between client device 11 and network 20 in step 304. Once connected, client device 11 may automatically send machine identification data in step 306.

In step 308, authentication device 38 may be configured to authenticate client devices and may receive the machine identification data. Although reference is made to authentication device 38 for this example, these example acts may be performed by any suitable component of network 20. For example one of servers 33a, 33b, or 33c depicted in FIG. 1 may serve as authentication device 38. However, the component acting as authentication device 38 is not confined to one of the servers depicted in FIG. 1.

The validity of the machine identification data may be determined in step 310. If the machine identification data is determined to be invalid, server 33a may terminate the connection in step 312. As an alternative, authentication device 38 may allow the connection to remain open and only provide access to those resources of network 20 that are required to retry the authentication of client device 11. As another alternative, authentication device 38 may allow the connection to remain open without granting access to any of resources of network 20.

If authentication device 38 determines that the machine identification data is valid, authentication device 38 may assign an IP address to client device 11 in step 314, and generate an authentication level in step 316. For example, the generated authentication level may provide access to certain resources of network 20.

In step 318, authentication device 33a may communicate one or more programs to client device 11 and client device 11 may execute the one or more programs in step 320 to configure client device 11 to operate in a desired manner. For example, client device 11 may execute one or more programs, or client device 11 may execute one or more logon scripts. In another example embodiment, authentication device 38 communicates a program, such as a logon script, to a server, such as server 33a, 33b, or 33c depicted in FIG. 1, and the server executes the program and communicates the result to client device 11.

At step 322, authentication device 38 determines whether user identification data has been received from client device 11. If user identification data is not received in step 322, authentication device 38 may continue to poll client device 11 for user identification data. As an alternative, authentication device 38 may stop polling client device 11. For example, a timeout period may elapse after which authentication device 38 does not provide access to the resources of network 20, or after which authentication device 38 ceases to accept user identification data.

If user authentication data is received in step 322, authentication device 38 may determine whether the authentication data for a user of client device 11 is valid in step 324. In one embodiment, authentication device 38 may return to step 322 and poll the connection to listen for user authentication data. In another embodiment, if the user authentication data is determined to be invalid, authentication device 38 may terminate the connection with client device 11. This may be done, for example, in a network where unauthorized intrusion carries a high risk of data loss or theft.

If the user identification data is found to be valid in step 324, authentication device 38 may change the authentication level to a different value in step 326. The modified authentication level may be higher or lower than the first authentication level. For example, in response to receipt of valid user authentication data, the client device 11 may be allowed access to another set of resources of network 20. In another example, in response to receipt of invalid user authentication data, authentication device 38 may lower the authentication level. By lowering the authentication level, the client device 11 may be further limited in which resources of network 20 it may access. In yet another example, lowering the authentication level in response to invalid user identification data may result in denying access to any network resources. In still another example, lowering the authentication level may result in termination of the connection between the client device 11 and network 20.

Thus, according to the above-described embodiment, a method is provided for assigning network connectivity parameters to a wireless client device to automatically create a wireless connection to the network when the client device is initially turned on or rebooted and then allow one or more programs to be executed to modify the configuration of the client device. The user may still provide authentication data that the authentication device may use to change the authentication level to allow access to additional or different network resources based upon authentication data provided.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method for accessing one or more resources in a computer network, the method comprising:
  receiving, from a client device connected to the computer network via one or more wireless access points, a first set of authentication data transmitted automatically by the client device to access a first set of network resources, the authentication data comprising machine identification data uniquely identifying the client device;
  assigning a first authentication level to the client device, the first authentication level allowing access to a first set of network resources;
  providing access to the client device to the first set of network resources based on the first authentication level;
  sending one or more programs to the client device based upon the first set of authentication data, at least one program comprising an executable logon script that configures the client device according to the logon script;
  receiving a second set of authentication data from the client device after the client device has executed the one or more programs, wherein the second set of authentication data comprises user identification data associated with a user of the client device; and
  assigning a second authentication level to the client device, the second authentication level providing access to the second set of network resources, wherein providing access to the client device to the second set of network resources corresponding to the second authentication level, comprises:
    if the second set of authentication data is valid, the second authentication level is greater than the first authentication level and the second set of network resources comprises at least one additional resource in addition to the first set of network resources; and
    if the second set of authentication data is not valid, such that the user identification data is not recognized, the second authentication level is less than the first authentication level and the second set of network resources comprises a subset of the first set of network resources, the subset comprising at least one resource but less than all resources of the first set of resources.

2. The method of claim 1, wherein receiving the second set of authentication data from the client device comprises receiving a username and password.

3. The method of claim 1, wherein receiving the second set of authentication data from the client device comprises receiving data stored in a computer readable medium.

4. The method of claim 1, wherein receiving the second set of authentication data from the client device comprises receiving biometric data.

5. The method of claim 1, wherein providing access to a first set of network resources comprises providing access to one or more computer readable media.

6. The method of claim 1, wherein providing access to a first set of network resources comprises providing access to one or more printers.

7. The method of claim 1, wherein receiving a second set of authentication data from the client device comprises receiving a second set of authentication data from the client device in response to a client device executing one or more logon scripts.

8. A computer system, comprising:
  a processor; and
  a storage device readable by the computer system, embodying logic executable by the processor, the logic operable when executed on the processor to:
    receive, from a client device connected to a network via one or more wireless access points, a first set of authentication data transmitted automatically by the client device to access a first set of network resources, the authentication data comprising machine identification data uniquely identifying the client device;
    assign a first authentication level to the client device, the first authentication level allowing access to a first set of network resources;
    provide access to the client device to the first set of network resources based on the first authentication level;
    send one or more programs to the client device based upon the first set of authentication data, at least one program comprising an executable logon script that configures the client device according to the logon script;
    receive a second set of authentication data from the client device after the client device has executed the one or more programs, wherein the second set of authentication data comprises user identification data associated with a user of the client device; and
    assign a second authentication level to the client device, the second authentication level providing access to the second set of network resources, wherein providing access to the client device to the second set of network resources corresponding to the second authentication level, comprises:
      if the second set of authentication data is valid, the second authentication level is greater than the first authentication level and the second set of network resources comprises at least one additional resource in addition to the first set of network resources; and
      if the second set of authentication data is not valid, such that the user identification data is not recognized, the second authentication level is less than the first authentication level and the second set of network resources comprises a subset of the first set of network resources, the subset comprising at least one resource but less than all resources of the first set of resources.

9. The apparatus of claim 8, wherein the second set of authentication data comprises a username and password.

10. The apparatus of claim 8, wherein the second set of authentication data comprises data stored in a computer readable medium.

11. The apparatus of claim 8, wherein the second set of authentication data comprises biometric data.

12. The apparatus of claim 8, wherein the first set of resources comprises a computer readable medium.

13. The apparatus of claim 8, wherein the first set of resources comprises a printer.

14. The apparatus of claim 8, wherein the second set of resources comprises a computer readable medium.

15. The apparatus of claim 8, wherein the second set of resources comprises a printer.

16. A method for providing access to one or more resources in a computer network, the method comprising:
  receiving, from a client device connected to the computer network via one or more wireless access points, machine identification data uniquely identifying the client device, the machine identification data transmitted automatically by the client device;
  generating an authentication level for the client device, the authentication level associated with accessing one or more resources in the computer network;

sending one or more programs to the client device, at least one program comprising an executable logon script that configures the client device according to the logon script;

receiving authentication data from the client device during the connection after the client device has executed the one or more programs, wherein the authentication data comprises user identification data associated with a user of the client device; and changing the authentication level of the user based upon the authentication data received during the connection, wherein:

if the authentication data is valid, the authentication level is increased and the client device is allowed to access at least one additional resource in addition to the one or more resource in the computer network; and if the authentication data is not valid, such that the user identification data is not recognized, the authentication level is decreased and the client device is allowed to access at least one resource that is at least one resource less than the one or more resource in the computer network.

17. The method of claim 16, wherein receiving authentication data comprises receiving a username and password.

18. The method of claim 16, wherein receiving authentication data comprises receiving data scored in a computer readable medium.

19. The method of claim 16, wherein receiving authentication data comprises receiving biometric data.

20. A computer system, comprising:

a processor; and a storage device readable by the computer system, embodying logic executable by the processor, the logic operable, when executed by the processor, to:

receive, from a client device connected to a computer network via one or more wireless access points, machine identification data uniquely identifying the client device, the machine identification data transmitted automatically by the client device;

generate an authentication level for the client device, the authentication level associated with accessing one or more resources in the computer network;

send one or more programs to the client device, at least one program comprising an executable logon script that configures the client device according to the logon script;

receive authentication data from the client device during the connection after the client device has executed the one or more programs, wherein the authentication data comprises user identification data associated with a user of the client device; and change the authentication level of the user based upon the authentication data received during the connection, wherein:

if the authentication data is valid, the authentication level is increased and the client device is allowed to access at least one additional resource in addition to the one or more resource in the computer network; and if the authentication data is not valid, such that the user identification data is not recognized, the authentication level is decreased and the client device is allowed to access at least one resource that is at least one resource less than the one or more resource in the computer network.

21. The apparatus of claim 20, wherein the authentication data comprises a username and password.

22. The apparatus of claim 20, wherein the authentication data comprises data stored in a computer readable medium.

23. The apparatus of claim 20, wherein the authentication data comprises biometric data.

24. The apparatus of claim 20, wherein the one or more resources comprise a computer readable medium.

25. The apparatus of claim 20, wherein the one or more resources comprise a printer.

* * * * *